US007524151B2

(12) United States Patent
Zhu

(10) Patent No.: US 7,524,151 B2

(45) Date of Patent: Apr. 28, 2009

(54) POWER TOOL WITH CUTTING DEPTH ADJUSTMENT MECHANISM

(75) Inventor: Yongbing Zhu, Nanjing (CN)

(73) Assignee: Chervon Limited, Hong Kong (HK)

(*) Notice: Subject to any disclaimer, the term of this patent is extended or adjusted under 35 U.S.C. 154(b) by 0 days.

(21) Appl. No.: 11/970,656

(22) Filed: Jan. 8, 2008

(65) Prior Publication Data

US 2008/0175683 A1 Jul. 24, 2008

(30) Foreign Application Priority Data

Jan. 24, 2007 (CN) .................... 2007 2 0033777 U

(51) Int. Cl.
*B23C 1/20* (2006.01)

(52) U.S. Cl. .................... 409/182; 409/210; 144/136.95

(58) Field of Classification Search ................. 409/182, 409/181, 175, 210, 214, 218, 206; 144/136.95, 144/154.5; 408/241 S, 202

See application file for complete search history.

(56) References Cited

U.S. PATENT DOCUMENTS

| | | | | |
|---|---|---|---|---|
| 4,640,324 | A * | 2/1987 | Lounds | 144/154.5 |
| 4,770,573 | A * | 9/1988 | Monobe | 409/182 |
| 5,853,274 | A | 12/1998 | Coffey et al. | |
| 5,913,645 | A * | 6/1999 | Coffey | 409/182 |
| 6,725,892 | B2 * | 4/2004 | McDonald et al. | 144/136.95 |
| 2002/0166245 | A1 * | 11/2002 | Williams | 30/388 |
| 2008/0193240 | A1 * | 8/2008 | Zhu | 409/182 |

* cited by examiner

*Primary Examiner*—Erica E Cadugan
(74) *Attorney, Agent, or Firm*—Greenberg Traurig LLP

(57) ABSTRACT

A power tool has a base assembly and a housing which is vertically movable relative to the base. The housing has a plurality of positioning components. A cutting depth adjustment mechanism is mounted on the base assembly and includes a support bracket and a sliding piece. The sliding piece is horizontally movable relative to the support bracket between a first position and a second position. When in the first position, the sliding piece is engaged with one of the positioning components and, when in the second position, the sliding piece is disengaged with the positioning components.

9 Claims, 3 Drawing Sheets

POWER TOOL WITH CUTTING DEPTH ADJUSTMENT MECHANISM

BACKGROUND

The present disclosure relates to a power tool which has an adjustable cutting depth, and more particularly, relates to a quickly adjustable cutting depth adjustment mechanism for the power tool.

A router generally comprises a base and a cutting unit which has a cutting bit mounted thereon. The cutting unit is movable relative to the base. In order to adjust the height of the bit relative to the workpiece, a depth adjustment mechanism is arranged between the base and the cutting unit.

By way of example, U.S. Pat. No. 5,853,274 discloses a router which comprises: (A) a base assembly which includes an annular base member and a cylindrical base member supported on the annular base member; (B) a cylindrical housing received within the cylindrical base member, wherein the cylindrical housing includes a plurality of vertically aligned first components; and (C) an adjustment mechanism supported on the base assembly, wherein the adjustment mechanism includes a lever and an adjustment device for moving the lever vertically with respect to the base assembly, and the lever has a second component which is movable between a first position and a second position. When at the first position, the second component is selectively engaged with one of the first components to prevent vertical sliding of the housing relative to the lever; when at the second position, the second component is disengaged with the first component so as to permit vertical sliding of the housing relative to the lever.

The adjustment mechanism disclosed hereinabove has several disadvantages. Firstly, the thickness of the first components is limited by the radial size of the cylindrical housing, so the distance between the first position and the second position is short, and thereby misoperation may happen. Secondly, the quick adjustment mechanism and the fine adjustment means move about the same axis, so interference may occur therebetween.

SUMMARY

The following describes an improved cutting depth adjustment mechanism for a power tool which is convenient to operate and will not create a misoperation. Generally, the power tool comprises a base assembly and a housing containing a motor and a transmission mechanism. The housing is vertically, movably mounted on the base assembly and has a plurality of positioning components including a cutting depth adjustment mechanism mounted on the base assembly. The depth of cut adjustment mechanism comprises a support bracket, a sliding piece which is movably mounted to the support bracket between a first position and a second position, a biasing device which biases the sliding piece to the first position whereat the sliding piece is engaged with one of the positioning components, and an actuating means, which is adapted to move the sliding piece to the second position whereat the sliding piece is disengaged with the positioning components.

To adjust the cutting depth, the sliding piece is moved from the first position to the second position to disengage the sliding piece from the positioning components whereupon the housing can be vertically moved. After the housing is adjusted to a desired position, the actuating device is released whereupon the sliding piece will be biased to the first position whereat the sliding piece is engaged with the positioning components thus fixing the housing relative to the base. Because length of the positioning components is not limited by radial size of the housing distance between the first position and the second position of the sliding piece can be set as demand to provide reliable adjustment.

In a further embodiment, a threaded pole is rotatably mounted on the base. The threaded pole is engaged with a threaded hole of the support bracket. When the sliding piece is in the first position, the threaded pole can be rotated to drive the support bracket. Because the sliding piece is engaged with the positioning components, fine adjustment of the housing can thus be achieved. During the operation, horizontal movement of the sliding piece and vertical movement of the adjustment mechanism will not interfere with each other thereby facilitating ease of operation.

BRIEF DESCRIPTION OF THE DRAWINGS

The subject power tool with cutting depth adjustment mechanism will become apparent from the following detailed description illustrated in the accompanying drawings, wherein.

DETAILED DESCRIPTION

Figure 1:
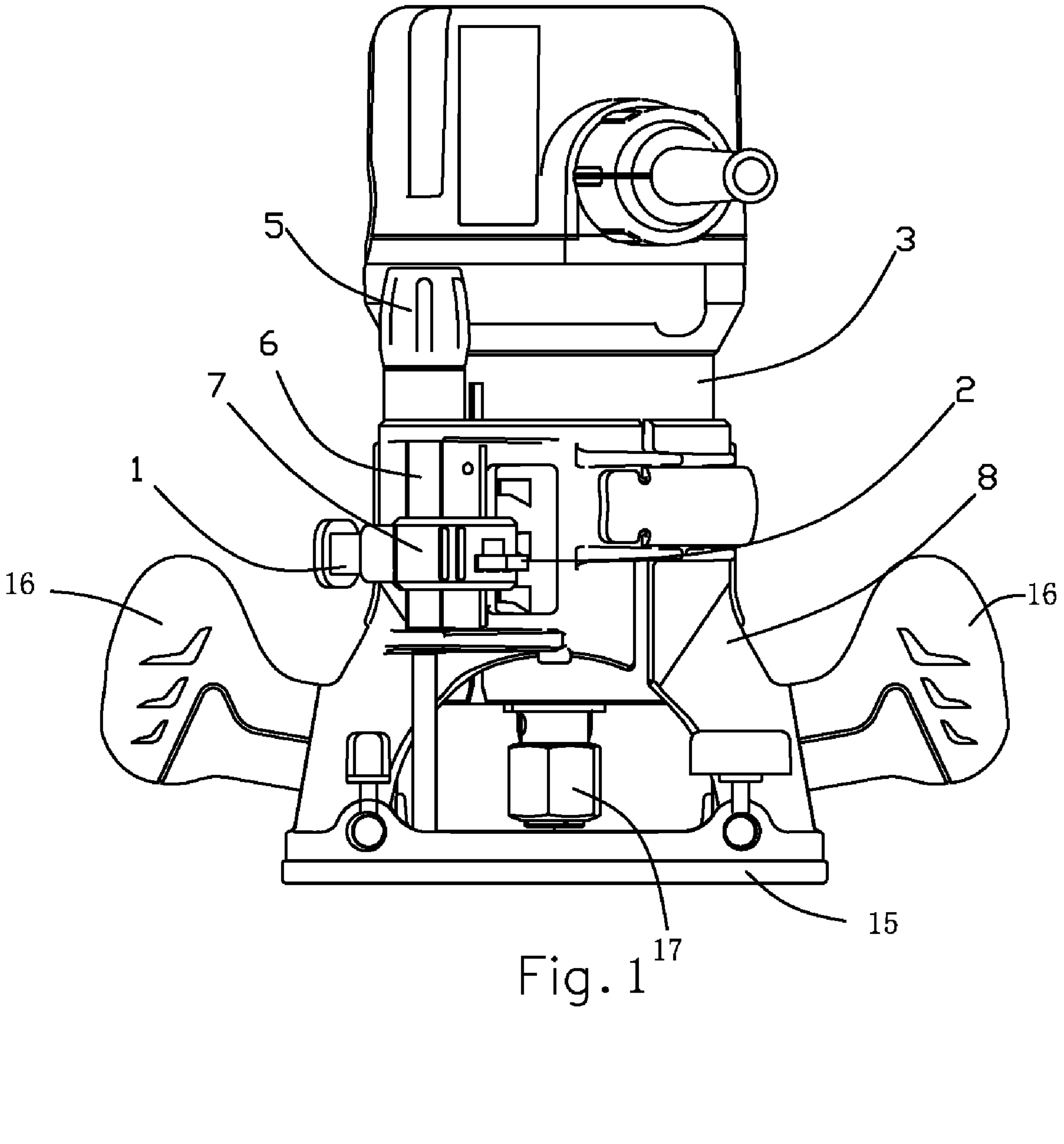
FIG. 1 is a schematic view of an exemplary embodiment of a power tool with cutting depth adjustment mechanism constructed according to the present invention.

With reference to the figures, FIG. 1 illustrates a power tool in the form of a router having a hollow base bracket 8 which is fixed on a base plate 15, two handles 16 mounted respectively on two sides of the base bracket 8, and a cutting unit 17. The power tool includes a motor and a transmission mechanism that is fixedly mounted within a cylindrical housing 3. The housing 3 is telescopically received within the base bracket 8 and is movable up and down relative thereto. During operation, the base plate 15 is movably supported on a workpiece, a cutting bit (not shown) is attached on the cutting unit 17 and is driven to rotate, and an operator can grip the handles 16 to perform cutting as desired.

Figure 2:
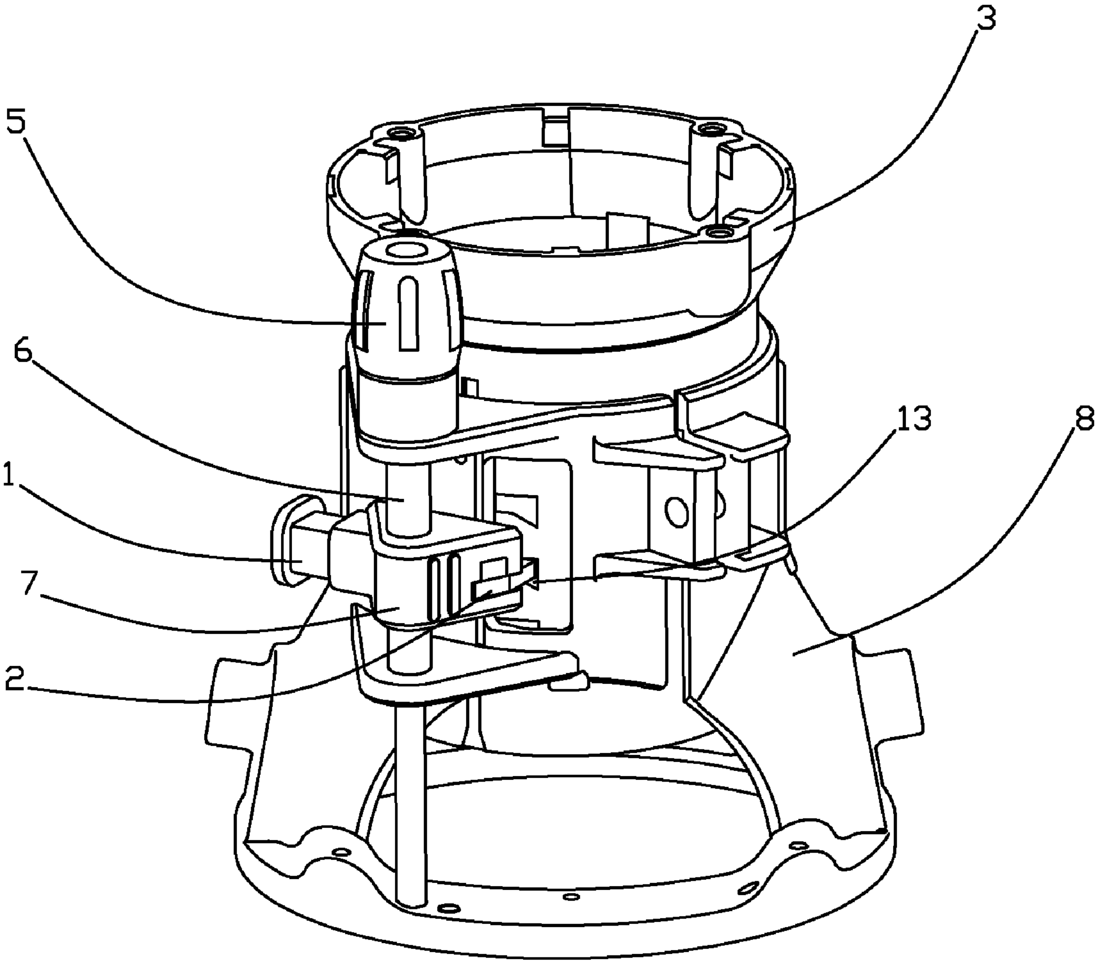
FIG. 2 is a schematic view of a portion of the power tool illustrated in FIG. 1.
Figure 3:
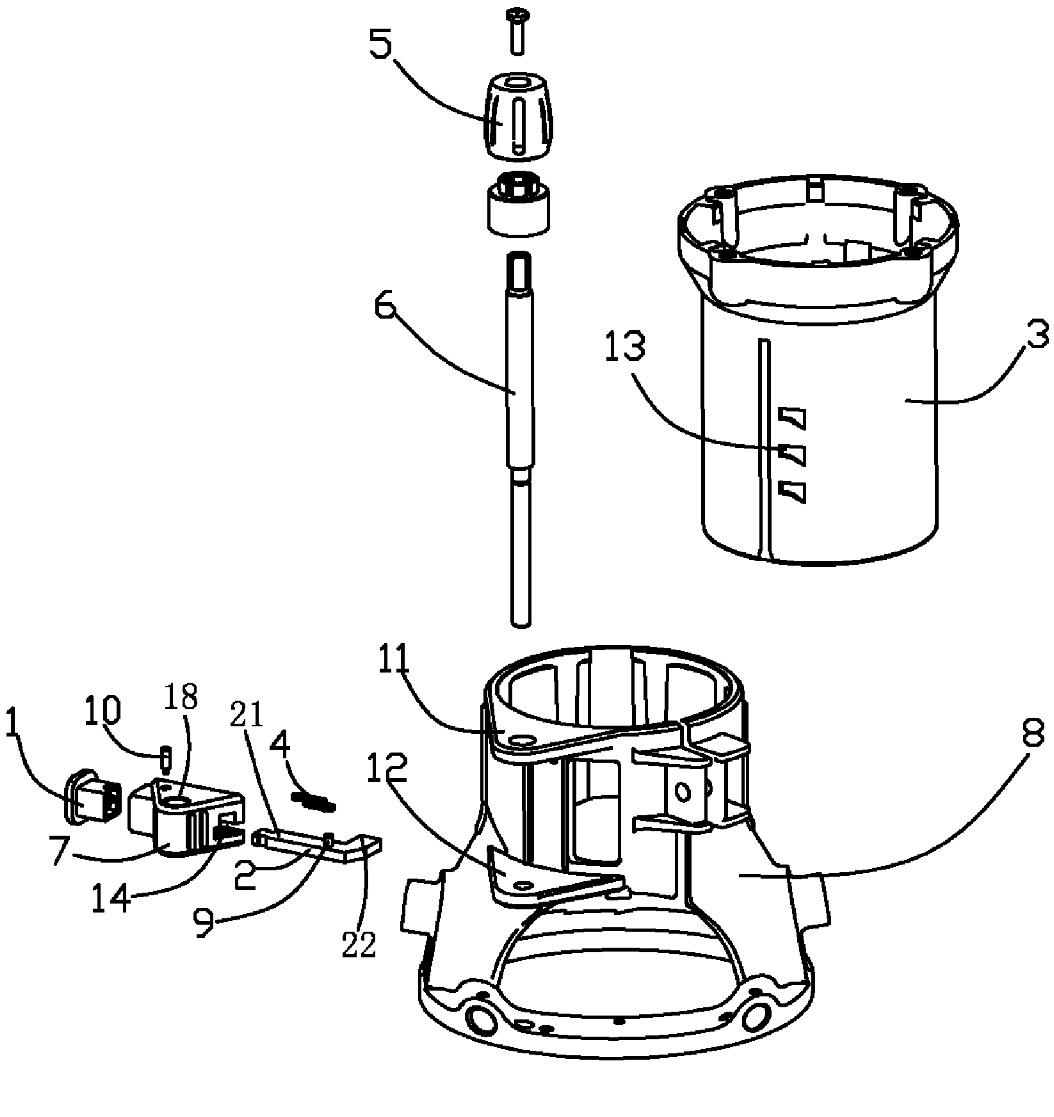
FIG. 3 is an exploded view of the adjustment mechanism of the power tool illustrated in FIG. 2.

In order to adjust the height of the bit relative to the workpiece, a plurality of recesses 13 are vertically positioned on the housing 3 as shown in FIG. 2 and FIG. 3. A depth adjustment mechanism is mounted on the base bracket 8.

Referring now to FIG. 2 and FIG. 3, the adjustment mechanism comprises a support bracket 7 and a sliding piece 2. Specifically, a pair of flanges 11, 12 radially extended from middle and upper portions of the base 8 respectively. A rotatable threaded pole 6 passes through holes of the flanges 11, 12, and penetrates into a hole of the base plate 15. The threaded pole 6 is axially immovable. A knob 5 is fixed on an upper end of the threaded pole 6. A portion of the threaded pole 6 which is positioned between the two flanges 11, 12 is engaged with a threaded hole 18 of the support bracket 7. The sliding piece 2 comprises a long bar portion 21 and a short bar portion 22, which forms an "L" shape. The long bar portion 21 of the sliding piece 2 is slidably received within a horizontal extended groove 14 of the support bracket 7. A button 1 is mounted on a free end of the long bar portion 21. A free end of the short bar portion 22 is engagable with the recesses 13 of the housing 3. A projection 9 on the sliding piece 2 and a pin 10 within the support bracket 7 are respectively connected with two ends of a spring 4.

When the button 1 is pressed, the sliding piece 2 moves to a first position whereat the free end of the short bar 22 is disengaged with the recesses 13, so that the housing 3 can be moved up and down to adjust the height of the bit relative to the workpiece. When the button 1 is released, the spring 4 biases the sliding piece 2 to a second position whereat the end of the short bar 22 inserts into the recesses 13 and thus fixes the housing 3 relative to the base 8 whereupon the router can perform cutting or to be fine adjusted.

To fine adjust the cutting height, the knob 5 is turned to rotate the threaded pole 6. Because the support bracket 7 is threadedly engaged with the threaded pole 6 and the short bar 22 of the sliding piece 2 is engaged with the recesses 13, the support bracket 7 will be linearly moved relative to the threaded pole 6 and the housing 3 and the cutting unit 17 can thus be moved, and the height of the bit can be adjusted accurately, relative to the workpiece.

The router according to the preferred embodiment is provided with rough adjustment mechanism and fine adjustment mechanism, so cutting depth can be adjusted accurately and conveniently. Because the length of the horizontal recesses 13 is not limited by radial size of the housing 3 the distance between the first position and the second position of the sliding piece 2 can be set as demand to provide reliable adjustment.

The present invention is not restricted as the embodiment disclosed hereinabove. Any substitutes and modifications according to the spirit of the present invention will be regarded as fall within the appended claims of the present invention.

What is claimed is:

1. A power tool comprising:

a base assembly;

a housing containing a motor and transmission mechanism connectable to a tool bit, wherein the housing is vertically movably mounted on the base assembly for movement relative to the base assembly along a vertical axis and includes a plurality of positioning components; and a cutting depth adjustment mechanism mounted on the base assembly wherein the depth of cut adjustment mechanism comprises:

a support bracket;

a sliding piece which is movably mounted to slide in a guiding groove of the support bracket between a first position and a second position;

a biasing device which biases the sliding piece to the first position whereat the sliding piece is engaged with one of the positioning components; and an actuating device, which is adapted to move the sliding piece to the second position whereat the sliding piece is disengaged with the positioning components.

2. The power tool of claim 1, further comprising a threaded pole wherein the threaded pole is connected to the base assembly and is axially immovable with respect thereto and is threadably engaged with a threaded hole defined on the support bracket.

3. The power tool of claim 2, wherein the base assembly has a pair of radially extended flanges each of which has a hole to allow the threaded pole to vertically pass therethrough and be rotatable therein.

4. The power tool of claim 3, wherein a portion of the threaded pole which is positioned between the two flanges is threadably engaged with the threaded hole of the support bracket.

5. The power tool of claim 1, wherein the positioning components comprise recesses formed on the housing.

6. The power tool of claim 5, wherein the sliding piece is generally "L" shaped and includes a long bar portion and a short bar portion, wherein the long bar portion is slidably received in the guiding groove of the support bracket and at least a portion of the short bar portion is engagable with the recesses formed on the housing.

7. The power tool of claim 6, wherein the actuating device is a button which is fixed on a free end of the long bar portion.

8. The power tool of claim 1, wherein the biasing device is a spring.

9. The power tool of claim 8, wherein the support bracket includes a pin and the sliding piece includes a projection and wherein the pin and the projection on the sliding piece are connected with two ends of the spring respectively.

* * * * *